Patented May 24, 1932

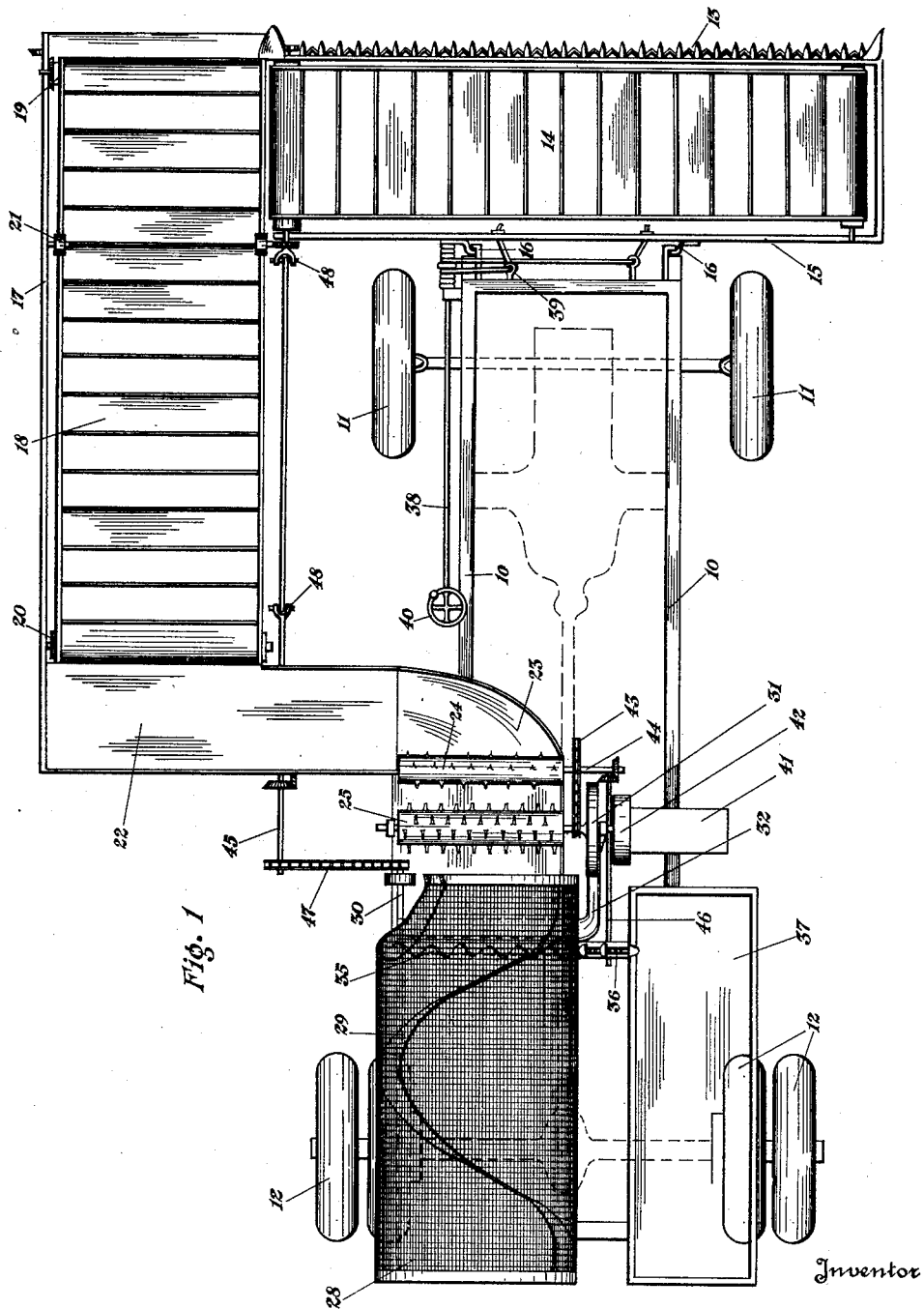

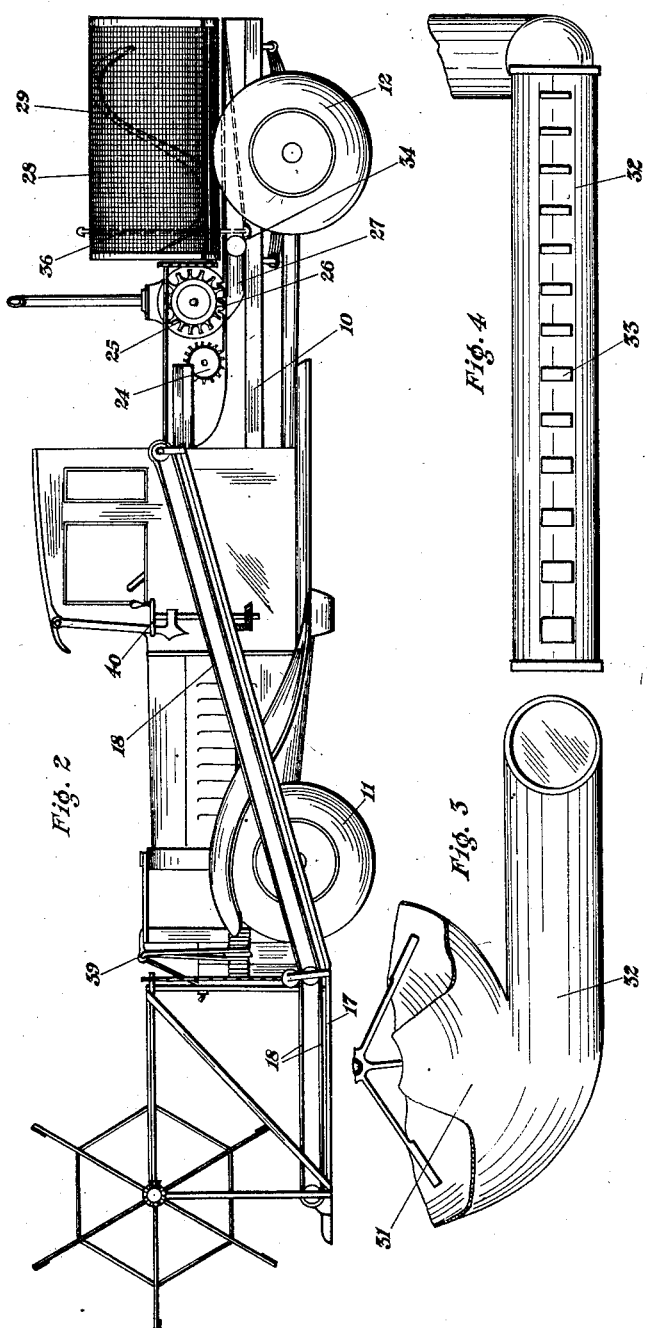

1,859,759

UNITED STATES PATENT OFFICE

RALPH S. WALTERS, OF GRANT, NEBRASKA

COMBINE

Application filed March 17, 1930. Serial No. 436,611.

My invention relates to combines, its primary object being the provision of a rearranged and reorganized structure which is adapted to be attached to and detached from a truck frame.

Another object of my invention is the provision of a combine which may be seated on any of the trucks ordinarily used and which may be easily removed from the truck.

Another of my objects is the provision of a combine structure in which the members are rearranged in position and so assembled as to result in a balance on the truck.

Another of my objects is the provision of a combine which is complete in all respects except for the wheel support.

Another of my objects is the provision of the combine assembly in which the harvesting and thrashing mechanism is operated by the power plant which is part of the combine assembly.

Another of my objects is the provision of a combine assembly which is compact and which when removed from the truck support may readily be stored within a small space in a machine or tool shed.

Having in view these objects and others which will be pointed out in the following description, I will now refer to the drawings, in which Figure 1 is a plan view of the truck frame with my combine attached thereto, a portion being broken away to disclose interior structure and housings generally omitted which would hide essential structure.

Figure 2 is a view in side elevation of the truck and of the combine attachment.

Figure 3 is a broken view in partial perspective of the blower.

Figure 4 is a view in rear elevation of the discharge tube from the blower.

The truck has the usual rectangular frame 10 mounted on front wheels 11 and on rear wheels 12. The combine includes cutting mechanism 13 in front of a slatted belt conveyor 14 on a cutter frame 15. The cutter frame 15 with the cutter 13 and the endless belt 14 is secured to the truck to extend forwardly thereof. It is secured to the truck against forward and lateral movements by means of guide members 16 which permit vertical movements of the cutter frame 15 relative to the truck. The cutter frame 15 projects forwardly from the truck so that no standing grain is knocked down by the truck wheels passing through the grain. The truck wheels all follow the cutting mechanism and therefore crush only the standing straw from which the grain has been removed.

At one of the sides of the cutter frame 15, preferably at the left-hand side, is a conveyor frame 17. This frame, as best shown in Figure 2, is first horizontal and then rearwardly and upwardly inclined. It carries an endless belt 18 which first carries the cut grain rearwardly in a horizontal direction and then rearwardly and upwardly. The endless belt 18 passes over front and rear rollers 19 and 20 respectively and it is guided into its inclined course by means of the idle rollers 21. The grain carried upwardly by the conveyor 18 is delivered to the transverse chute 22.

The cut grain which consists largely of the unshelled heads of grain is carried toward the right in the chute 22 until its direction is altered in the extension 23 of the chute 22. In the rearward movement of the grain through the chute extension 23 it first encounters the beater 24 which evenly distributes the grain heads in a transverse direction. The grain is fed by the beater to the cylinder 25 which cooperates with the concave 26. A portion of the thrashed grain falls into the cleaning shoe or chaffer 27 directly from the concave 26. Most of the grain and practically all of the chaff are forced rearwardly from the cylinder 25 into the rotating screen 28. This screen has a relatively slow movement and it is provided on its inner side with a spiral guide 29 which carries the grain and chaff rearwardly but which allows the grain to fall through into the cleaning shoe or chaffer 27. The cylindrical screen 28 rests on a shaft 30 which slowly turns the screen.

The grain is further cleaned by means of a blast of air from the fan 31 passing through the tube 32. This tube 32 has a horizontal portion extending transversely of the cleaning shoe and it creates a blast of air in a rearward direction to force out the straw. From an inspection of Figure 4 it will be noted that the horizontal portion of the tube 32 is provided with a plurality of spaced apertures 33 which increase in size toward its outer end. As the velocity of the air blast decreases toward the outer end of the tube 32, the outlets 33 grow larger in size so that the air is fairly evenly distributed.

The cleaning shoe 27 is provided with a transverse channel 34 for seating a spiral conveyor 35. The cleaned grain which gathers in the channel 34 is thus conveyed transversely to the elevator 36 which in the present instance is a bucket conveyor. The grain is thus carried into the bin 37 as shown in Figure 1 and the chaff is carried out through the rear end of the cylindrical screen 28.

The cutting mechanism is adjustable so that it will cut the grain at the desired height. As before stated, there are guiding members connecting the truck frame 10 to the cutter frame 15, these guiding members permitting relative vertical movement. The hand operated shaft 38 is secured to a pair of cables which pass through eyes 39 on the truck frame and which are secured to the cutter frame 15 as shown in Figure 1, the eyes 39 being at a higher level than the connections between the cables and the cutter frame. By turning the hand wheel 40 the cutter frame 15 may be raised or lowered without tilting the cutter frame.

The truck is propelled by means of its own power plant but the combine mechanism is driven from its own engine 41 which is here shown merely in conventional form. The shaft of the engine 41 drives a flywheel 42 and it also drives the fan 31 and the cylinder 25. The engine shaft is connected through the chain 43 with the shaft 44 of the beater 24. The shaft 44 also drives the shafts 45 and 46. The shaft 45 is connected through the chain 47 to drive the shaft 30. The shaft 46 drives the elevating conveyor 36. The shaft 45 projects forwardly being provided with two universal joints 48 from whence it leads directly to the left-hand drive roller of the endless belt 14. The shaft 45 at its forward end is also geared to drive the forward drive roller of the endless belt 18.

From the foregoing description it will be seen that I have provided a combine assembly of compact form which is readily balanced on a truck. The great advantage of my combine is that the cost of the truck is not included in the cost of the implement. The season during which a combine is generally used, especially by individual farmers, is at most only a few weeks so that it is desirable to reduce the capital investment as much as possible. Most farms are already provided with one or more trucks for hauling farm products to market and for bringing supplies and provisions to the farm. Farmers who already own a truck need to invest only in the combine structure as described above in order to be equipped with a complete combine.

The above described structure has the further advantage that it is exceedingly compact, and this advantage is particularly evident during the long period when the implement is not in use. The prior combines are large and bulky and the tendency is to leave them exposed to the elements in the field or farm-yard throughout the greater portion of the year. Under such conditions the combine is very short-lived. If not left in the field the combine must be housed but the building cost of housing a large implement is prohibitive. With my invention, however, the combine assembly must be removed from the truck after each season of work is over in order to make the truck available for other use. When removed from the truck, the combine assembly occupies very little space so that it can be easily stored in a corner of the machine or tool shed with the result that its life will be very much greater than that of the prior combines.

It is to be understood that the drawings are illustrative merely of the general arrangement of the various parts and that they are not intended to illustrate each and every feature of my combine nor to serve as working plans for enabling the mechanic to build the combine. For example, the housings are omitted entirely where they would obscure essential features of the invention even though these housings may be absolutely essential in the successful operation of the implement. This is particularly true of the screen 28 which must be provided with a housing in order to prevent the unnecessary waste of grain.

Having thus described my invention in such full, clear, and exact terms that its construction and operation will be readily understood by others skilled in the art to which it pertains, what I claim as new and desire to secure by Letters Patent of the United States is:

1. In combination, an automobile truck and a harvester attachable to and detachable from said truck as a unit, said harvester including a cutter frame releasably secured to said truck to project forwardly therefrom, a conveyor on said cutter frame for carrying the cut grain laterally, a second conveyor for receiving the cut grain from the first said conveyor and for carrying the cut grain rearwardly and upwardly, said second conveyor being positioned to one side of said truck and spaced therefrom, thrashing mechanism on the rear portion of said truck, a chute for conducting the cut grain from said second conveyor to said thrashing mechanism, a grain bin on said truck, means for delivering the thrashed grain to said grain bin, and means for discharging the chaff from said thrashing mechanism during the travel of said truck.

2. A combine adapted to be releasably secured to the frame of an automobile truck and to be supported thereby, said combine including a cutter frame projecting forwardly of the automobile truck and a thrashing mechanism adapted to be supported on the rear portion of the platform of the automobile truck, a conveyor at the side of the automobile truck for conducting the cut grain from said cutter frame to said thrashing mechanism, means for discharging the chaff during the travel of the automobile truck, a motor having a drive shaft in alignment with the cylinder shaft of the said thrashing mechanism, and means whereby the rotation of the cylinder shaft of said thrashing mechanism is caused to actuate the cutting mechanism of the said cutting frame, said conveyor and all of the said thrashing mechanism.

In testimony whereof I affix my signature.

RALPH S. WALTERS.